United States Patent
Norita et al.

(10) Patent No.: US 9,257,682 B2
(45) Date of Patent: Feb. 9, 2016

(54) METHOD FOR MANUFACTURING EXTERNAL CLADDING FOR LAMINATE BATTERY

(75) Inventors: Katsunari Norita, Osaka (JP); Norimasa Miura, Osaka (JP); Setsuko Koura, Tokyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 14/007,338

(22) PCT Filed: Mar. 16, 2012

(86) PCT No.: PCT/JP2012/056839
§ 371 (c)(1),
(2), (4) Date: Sep. 25, 2013

(87) PCT Pub. No.: WO2012/132956
PCT Pub. Date: Oct. 4, 2012

(65) Prior Publication Data
US 2014/0013590 A1   Jan. 16, 2014

(30) Foreign Application Priority Data

Mar. 29, 2011  (JP) ................. 2011-071667

(51) Int. Cl.
*H01M 2/02* (2006.01)
*B21D 22/22* (2006.01)

(52) U.S. Cl.
CPC ............. *H01M 2/02* (2013.01); *B21D 22/22* (2013.01); *H01M 2/0277* (2013.01); *H01M 2/0285* (2013.01); *H01M 2/0287* (2013.01); *Y10T 29/49115* (2015.01)

(58) Field of Classification Search
None
See application file for complete search history.

(56) References Cited

U.S. PATENT DOCUMENTS 6,730,407 B2   5/2004  Mori

FOREIGN PATENT DOCUMENTS

| JP | H11-309519 A | 11/1999 |
|----|----|----|
| JP | 2002-198016 A | 7/2002 |
| JP | 2003-092087 A | 3/2003 |
| JP | 2004-052100 A | 2/2004 |
| JP | 2007-168184 A | 7/2007 |

(Continued)

OTHER PUBLICATIONS

International Search Report from the International Bureau of WIPO for International Application No. PCT/JP2012/056839 dated May 1, 2012 (2 pages).
European Search Report date of mailing Sep. 1, 2014 for European Patent Application No. 12765043.0 (10 pages).
M.A. Selles, S.R. Schmid and V.J. Segui: "Ironability of a three-layered polymer coated steel Part1: Experimental Investigation", Journal of Materials Processing Technology, vol. 202 in Dec. 2007.
Ajay Yadav et al: "Warm Forming of Stainless Steels—Part I", thefabricator.com, Jul. 11, 2006.

(Continued)

*Primary Examiner* — Patrick Ryan
*Assistant Examiner* — Wyatt McConnell
(74) *Attorney, Agent, or Firm* — Fitch Even Tabin & Flannery LLP

(57) ABSTRACT

In method for manufacturing an external cladding for a laminate battery according to the present invention, austenitic stainless steel foil having a thermoplastic resin layer on one of a front surface and a rear surface and a lubricating film on the other surface is used as a material, the stainless steel foil is disposed such that the surface provided with the thermoplastic resin layer opposes a punch, and drawing is implemented on the stainless steel foil without using lubricating oil in a condition where an annular region of the stainless steel foil, which is contacted by a shoulder portion of the punch, is set at a temperature of 20° C. or lower, and an exterior region on an exterior of the annular region is set at a temperature between 40° C. and 100° C.

1 Claim, 4 Drawing Sheets

(56) References Cited

FOREIGN PATENT DOCUMENTS

| | | |
|---|---|---|
| JP | 2008-004506 A | 1/2008 |
| JP | 2009-113058 A | 5/2009 |
| JP | 2009-113059 A | 5/2009 |
| JP | 2010-194759 A | 9/2010 |

OTHER PUBLICATIONS

Ajay Yadav et al: "Warm Forming of Stainless Steels—Part II", thefabricator.com, Aug. 5, 2006.

Linus Larsson: "Warm Sheet Metal Forming with Localized in-Tool Induction Heating", Lund University; Department of Mechanical Engineering, Oct. 31, 2005.

METHOD FOR MANUFACTURING EXTERNAL CLADDING FOR LAMINATE BATTERY

CROSS-REFERENCE TO RELATED APPLICATIONS

This application is a U.S. national phase application filed under 35 U.S.C. §371 of International Application PCT/JP2012/056839, filed on Mar. 16, 2012, designating the United States, which claims priority from Japanese Patent Application No. 2011-071667, filed Mar. 29, 2011, which are hereby incorporated herein by reference in their entirety.

TECHNICAL FIELD

The present invention relates to a method for manufacturing an external cladding for a laminate battery, and more particularly to a novel improvement for enabling the accommodation of a battery capacity increase and the reduction of the possibility of infiltration of contamination by impurities in the interior of the laminate battery by using as a material austenitic stainless steel foil having a thermoplastic resin layer on one of a front surface and a rear surface and a lubricating film on the other of the front surface and the rear surface, and performing drawing under temperature conditions appropriate for the material without using lubricating oil.

BACKGROUND ART

Recently, laminate batteries in which a battery element is sealed by external cladding (laminate sheets) have drawn attention as a form of a secondary battery such as a lithium battery. Japanese Patent Application Publication No. 2004-052100 A discloses a method for manufacturing the external cladding on which a projecting portion for housing the battery element is formed by using austenitic stainless steel foil as a material, and by implementing drawing on the stainless steel foil at room temperature. By employing the external cladding made of the stainless steel foil in this manner, a strong and lightweight laminate battery can be constructed.

This type of laminate battery is applied to electric automobiles or the like, and therefore requires a large capacity in order to extend the range of electric automobiles for instance. To increase the capacity of the laminate battery, a space that can accommodate a larger battery element must be secured. With the configuration described above, however, drawing is implemented on the stainless steel foil at room temperature, and therefore molding defects such as cracks occur when an attempt is made to form a deep projecting portion.

Japanese Patent Application Publication No. 2009-113058 A discloses a configuration for realizing deep drawing, when drawing is implemented on austenitic stainless steel sheet, by performing warm working in which a region of the stainless steel foil that contacts a punch is cooled, a region on an exterior thereof is heated, and the punch is pressed into the stainless steel foil while supplying lubricating oil.

The present applicant considered the application of drawing such as that described in Japanese Patent Application Publication No. 2009-113058 A to manufacture external claddings for laminate batteries such as that described in Japanese Patent Application Publication No. 2004-052100 A, but found that the following problems arise. The method described in Japanese Patent Application Publication No. 2009-113058 A requires the performance of washing for degreasing after the drawing because the drawing is performed while supplying lubricating oil. When a laminate battery is constructed using external claddings manufactured by this drawing process, however, the lubricating oil as well as dust and the like adhered to the lubricating oil may infiltrate interior of the battery, causing the battery to malfunction. If the lubricating oil is simply not used, on the other hand, the material can no longer be moved smoothly, and therefore deep drawing cannot be realized.

SUMMARY OF THE INVENTION

The present invention has been designed to solve the problems described above, and an object thereof is to provide a method for manufacturing an external cladding for a laminate battery for enabling the accommodation of a battery capacity increase and the reduction a possibility of infiltration of contamination by impurities in the interior of the laminate battery.

A method for manufacturing external cladding for a laminate battery according to the present invention is a method wherein;

an external cladding for a laminate battery, in which a projecting portion for housing a battery element is formed is manufactured by using as a material austenitic stainless steel foil having a thermoplastic resin layer on one of a front surface and a rear surface and a lubricating film on the other of the front surface and the rear surface;

disposing the stainless steel foil such that the surface provided with the thermoplastic resin layer is opposite a punch; and implementing drawing on the stainless steel foil without using lubricating oil in a condition where an annular region of the stainless steel foil, which is contacted by a shoulder portion of the punch, is set at a temperature of 20° C. or lower, and an exterior region on an exterior of the annular region is set at a temperature between 40° C. and 100° C.

In the method for manufacturing external cladding for a laminate battery according to the present invention, the austenitic stainless steel foil having the thermoplastic resin layer on one of the front surface and the rear surface and the lubricating film on the other surface is used as the material, and drawing is performed on the material under appropriate temperature conditions without the use of lubricating oil. Hence, the thermoplastic resin layer and the lubricating film having been softened by heating exhibit the functions of conventionally used lubricating oil, and therefore deep drawing can be realized without the use of lubricating oil. As a result, an increase in battery capacity can be accommodated, and the possibility of infiltration of contamination by impurities in the interior of the laminate battery can be reduced.

DETAILED DESCRIPTION OF THE PREFERRED EMBODIMENTS

An embodiment of the present invention will be described below with reference to the drawings.

First Embodiment

Figure 1:
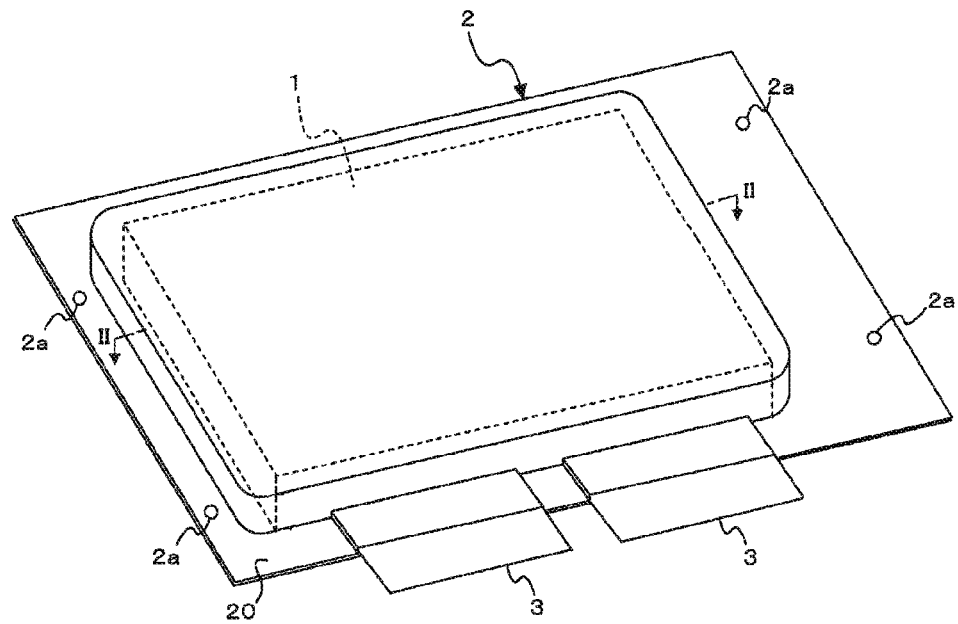
FIG. 1 is a perspective view showing a laminate battery according to a first embodiment of the present invention.

FIG. 1 is a perspective view showing a laminate battery according to a first embodiment of the present invention. In the drawing, a battery element 1 is stored in an interior of a battery case 2. As is well known, the battery element 1 is a laminated body including a positive electrode, a negative electrode, and a separator, which is submerged in an electrolyte. A pair of tabs 3 (projecting terminals of the positive electrode and the negative electrode) are connected to the battery element 1. The tabs 3 are drawn out to an exterior of the battery case 2 and connected to an external power supply or an external load, not shown in the drawing. A plurality of attachment holes 2a are provided in the battery case 2. The attachment holes 2a are used to attach the laminate battery to an object of attachment such as an electric automobile.

Figure 2:
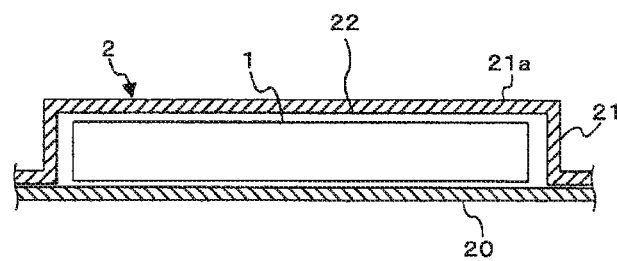
FIG. 2 is a sectional view taken along a line II-II in FIG. 1.

FIG. 2 is a sectional view taken along a line II-II in FIG. 1. As shown in the drawing, the battery case 2 includes a flat plate-shaped first external cladding 20, and a second external cladding 21 provided with a projecting portion 21a. The battery element 1 is housed in a housing space 22 formed by the projecting portion 21a of the second external cladding 21 and the first external cladding 20. In other words, the projecting portion 21a is used to house the battery element 1. As will be described in more detail below using the drawings, the projecting portion 21a is formed by drawing.

Figure 3:
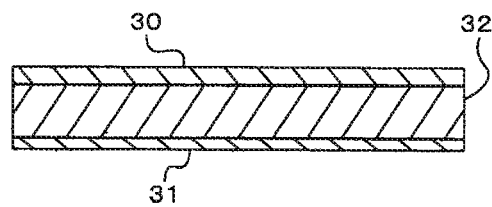
FIG. 3 is a sectional view showing first and second external claddings of FIG. 2.

FIG. 3 is a sectional view showing the first and second external claddings 20, 21 of FIG. 2. As shown in the drawing, stainless steel foil 32 having a thermoplastic resin layer 30 (a laminate layer) on one of a front surface and a rear surface and a lubricating film 31 on the other surface is used as a material of the first and second external claddings 20, 21.

The thermoplastic resin layer 30 is a resin layer of approximately 60 μm, which is formed from a resin that melts when heated to approximately 120 to 200° C. The battery case 2 shown in FIG. 1 is formed by overlapping the respective thermoplastic resin layers 30 of the first and second external claddings 20, 21 and then applying heat to the first and second external claddings 20, 21 while restraining the first and second external claddings 20, 21 so that the respective thermoplastic resin layers 30 of the first and second external claddings 20, 21 are thermally bonded (heat-sealed) to each other. As the thermoplastic resin layer 30, a heat seal insulation film such as a polyethylene film or a polypropylene film may be used individually. Alternatively, the thermoplastic resin layer 30 may be formed by joining a polyethylene terephthalate film to a joint part of the stainless steel foil 32 and then laminating a heat seal insulation film such as a polyethylene film or a polypropylene film onto the polyethylene terephthalate film.

The lubricating film 31 is a layer of approximately 2 μm, which is provided to impart superior moldability and chemical resistance to the external claddings 20, 21. The lubricating film 31 may be a resin film disclosed by the present applicant in Japanese Patent Application Publication No. 2008-307092, for example, or more specifically a resin film formed from one or more types of resin selected from polyvinyl alcohol resin, urethane resin, and acrylic resin, wherein the ratio between the weight of OH groups and a total weight of the resin is no less than 0.2.

Austenitic stainless steel sheet of approximately 10 to 400 μm is used as the stainless steel foil 32. When strain is applied thereto at room temperature, the austenite is more likely to undergo martensitic transformation in steel grades with more unstable austenite. As a result, austenitic stainless steel has a property of dramatically hardening from transformation hardening in combination with work hardening. Hence, drawing performance can be improved greatly by cooling an annular region of the stainless steel foil 32 that is contacted by a shoulder portion 42d of a punch 42 (see FIG. 4), to be described below, in order to maintain high strength while heating a region on an exterior thereof in order to suppress hardening due to martensitic transformation.

Figure 4:
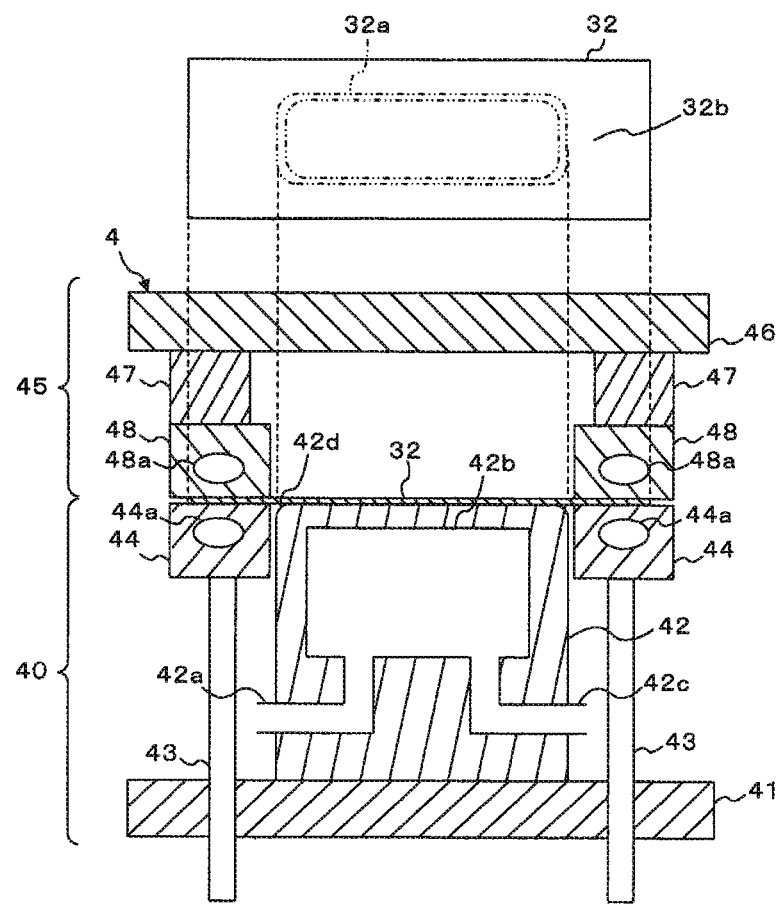
FIG. 4 is a configuration diagram showing a mold used to implement a method for manufacturing external cladding for a laminate battery in order to manufacture the second external cladding of FIG. 2.

FIG. 4 is a configuration diagram showing a mold 4 used to implement a method for manufacturing external cladding for a laminate battery in order to manufacture the second external cladding 21 of FIG. 2. As shown in the drawing, the mold 4 is provided with a lower mold 40 and an upper mold 45 disposed so as to sandwich the stainless steel foil 32. The lower mold 40 is provided with a bed 41, the punch 42 which is fixed to the bed 41, and a blank holder 44 that is disposed at an outer peripheral position of the punch 42 and coupled to the bed 41 via a cushion pin 43. The upper mold 45 is provided with a slide 46, and a die 48 that is disposed above the blank holder 44 and fixed to the slide 46 via a spacer 47.

A servo motor, not shown in the drawing, is connected to the slide 46. The slide 46, the spacer 47, and the die 48, or in other words the upper mold 45, are(is) driven integrally in a direction approaching the lower mold 40 and a direction moving away from the lower mold 40 by the driving force of the servo motor. Drawing is implemented by displacing the upper mold 45 in the direction approaching the lower mold 40 such that the punch 42 is pressed into an inner side of the die 48 together with the stainless steel foil 32.

The punch 42 is provided with an introduction passage 42a connected to an external coolant system, not shown in the drawing, a cooling chamber 42b into which a coolant is introduced through the introduction passage 42a, and a discharge passage 42c for discharging the coolant from the cooling chamber 42b. In other words, the punch 42 can be cooled by introducing the coolant into the cooling chamber 42b. When the cooled punch 42 contacts the stainless steel foil 32, an annular region 32a of the stainless steel foil 32, which is contacted by the shoulder portion 42d of the punch 42, is cooled. Note that the cooling range of the stainless steel foil 32 is not limited to the annular region 32a alone, and as long as at least the annular region 32a is cooled, a region on the inner side of the annular region 32a may also be cooled. In this embodiment, the interior region of the annular region 32a is cooled in addition to the annular region 32a since the stainless steel foil 32 is cooled by the punch 42.

Although not shown in the drawing, the cooling effect on the stainless steel plate 32 can be enhanced by disposing a counterpunch coupled to a slide via a spring or the like in a position opposing the punch and providing a cooling chamber into which the coolant is introduced in the counterpunch.

Heaters 44a, 48a are built respectively into the blank holder 44 and the die 48 in order to heat the blank holder 44 and the die 48. By sandwiching the stainless steel foil 32 between the heated blank holder 44 and die 48, an exterior region 32b at the exterior of the annular region 32a is heated.

Next, a method for manufacturing the external cladding for a laminate battery using the mold 4 shown in FIG. 4 will be described. To manufacture the second external cladding 21 having the projecting portion 21a shown in FIG. 2, the stainless steel foil 32 is placed on the punch 42 and the blank holder 44 so that the surface thereof provided with the thermoplastic resin layer 30 opposes the punch 42 in a condition where the upper mold 45 is separated from the lower mold 40. Next, the upper mold 45 is lowered to a position where the stainless steel foil 32 is sandwiched between the blank holder 44 and the die 48. The reason for setting a placement direction of the stainless steel foil 32 such that the surface provided with the thermoplastic resin layer 30 opposes the punch 42 is to ensure that the first external cladding 20 and the second external cladding 21 are heat-sealed by the respective thermoplastic resin layers 30 thereof as shown in FIG. 2. Note that when the punch 42 is disposed on the upper side and the die 48 is disposed on the lower side, the stainless steel foil 32 is placed on the die 48.

At this time, the punch 42 is cooled and the blank holder 44 and die 48 are heated until the annular region 32a of the stainless steel foil 32 is no higher than 20° C. and no lower than 0° C., and the exterior region 32b of the stainless steel foil 32 is no lower than 40° C. and no higher than 100° C., preferably no lower than 60° C. and no higher than 100° C., and more preferably no lower than 60° C. and no higher than 80° C.

The reason for setting the annular region 32a at no higher than 20° C. is that when the annular region 32a exceeds 20° C., it becomes impossible to obtain a sufficient increase in fracture strength of a punch portion through martensitic transformation. Further, the reason for setting the annular region 32a at no lower than 0° C. is that when the annular region falls below 0° C., frost adheres to the punch 42 and the annular region, and as a result, the shape characteristics of a molded article may be impaired. Moreover, the molded article may collapse due to temperature shrinkage when released from the mold.

The reason for setting the exterior region 32b at no lower than 40° C. is that when the temperature of the exterior region 32b falls below 40° C., it becomes impossible to obtain a sufficient effect for suppressing hardening due to martensitic transformation. Further, the reason for setting the exterior region 32b at no higher than 100° C. is that when the temperature of the exterior region exceeds 100° C., the thermoplastic resin layer 30 may melt. By preventing the thermoplastic resin layer 30 from melting, heat seal performance between the first external cladding 20 and the second external cladding 21 can be maintained. Furthermore, by setting the temperature of the exterior region between 40° C. and 100° C., the thermoplastic resin layer 30 can be softened without melting. By softening the thermoplastic resin layer 30 in this manner, the thermoplastic resin layer 30 is caused to exhibit a lubricating property.

After setting the respective temperatures of the annular region 32a and the exterior region 32b at the temperatures described above, the upper mold 45 is lowered further. As a result, the punch 42 is pressed into the inner side of the die 48 together with the stainless steel foil 32 such that drawing is implemented, whereby the second external cladding 21 including the projecting portion 21a is manufactured. No lubricating oil is used through the entire drawing process.

Figure 5:
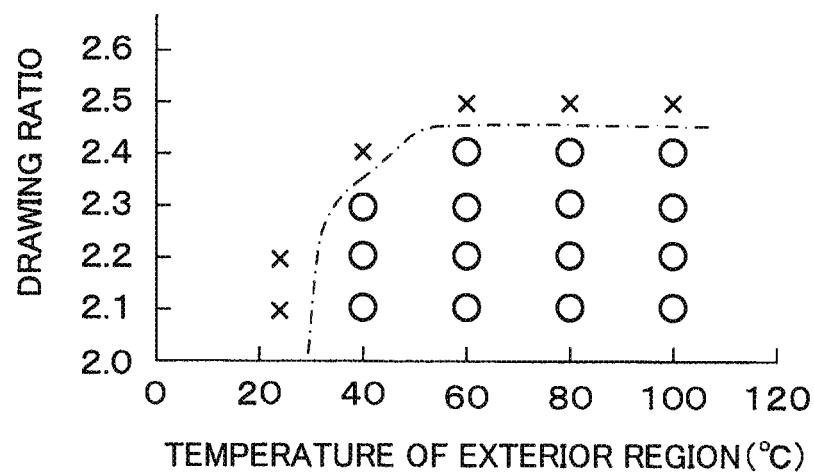
FIG. 5 is an illustrative view showing a drawing performance achieved when the method for manufacturing external cladding for laminate battery according to this embodiment is applied.

FIG. 5 is an illustrative view showing drawing performance achieved when the method for manufacturing external cladding for a laminate battery according to this embodiment is applied. The present applicant manufactured the external cladding 21 including the projecting portion 21a set at φ40 using a circular mold 4 configured as shown in FIG. 4 under various drawing ratio (diameter of material/diameter of finished article) conditions. A 60 μm polypropylene film (acid-modified polypropylene thickness 30 μm, melting point 120° C.+polypropylene homopolymer thickness 30 μm, melting point 160° C.) was used as the thermoplastic resin layer 30, a 2 μm aqueous urethane resin film with 10% added wax was used as the lubricating film 31, and austenitic stainless steel foil (SUS304) having a sheet thickness of 100 μm was used as the stainless steel foil 32. Further, the diameter of the punch 42 was set at 40.0 mm, the punch shoulder portion R was set at 2.5 mm, a hole diameter of the die 48 was set at 40.4 mm, and the die shoulder R was set at 2.0 mm.

Under these conditions, drawing was performed with the temperature of the annular region 32a (the punch 42) set at 10° C. while varying the temperature of the exterior region 32b (the blank holder 44 and the die 48) between room temperature (25° C.) and 100° C. As shown in FIG. 5, at room temperature, molding defects occurred even when drawing was performed at a drawing ratio of 2.1. By setting the temperature of the exterior region 32b within a range of 40° C. to 100° C., however, molding could be achieved successfully even when drawing was performed at a larger drawing ratio. It is evident from these results that when the temperature conditions according to this embodiment are applied, deep drawing can be realized without the use of lubricating oil.

Figure 6:
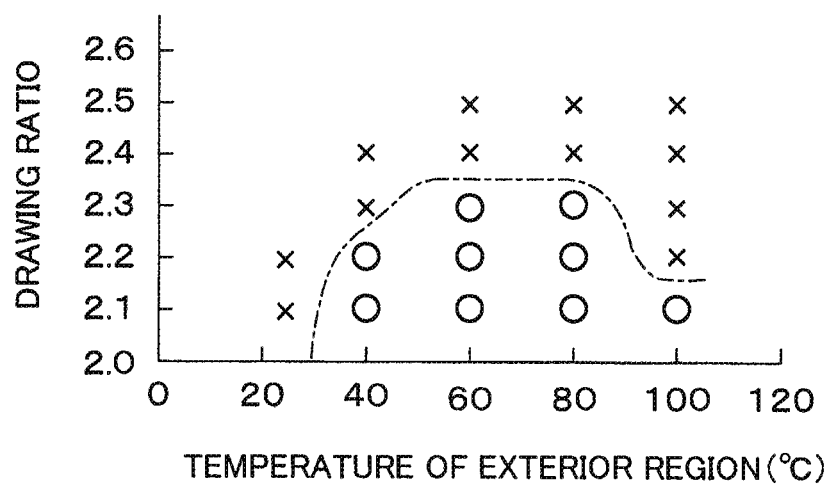
FIG. 6 is an illustrative view showing the drawing performance when lubricating oil is used.

FIG. 6 is an illustrative view showing the drawing performance when lubricating oil is used. As a comparative example, the present applicant implemented drawing on austenitic stainless steel foil (SUS304) having a sheet thickness of 100 μm but not provided with the thermoplastic resin layer 30 and the lubricating film 31 while supplying lubricating oil, as in the prior art. As shown in FIG. 6, when lubricating oil was used, an upper limit drawing ratio at which molding could be achieved successfully was lower than when the method according to the inventive embodiment was applied. The assumed reason for this is that in the temperature range according to the inventive embodiment, the thermoplastic resin layer 30 and the lubricating film 31 having been softened by heating exhibits a lubricating property superior to lubricating oil. The superiority of the method of using the austenitic stainless steel foil 32 provided with the thermoplastic resin layer 30 and the lubricating film 31 as a material and implementing warm working thereon is evident from these results.

Figure 7:
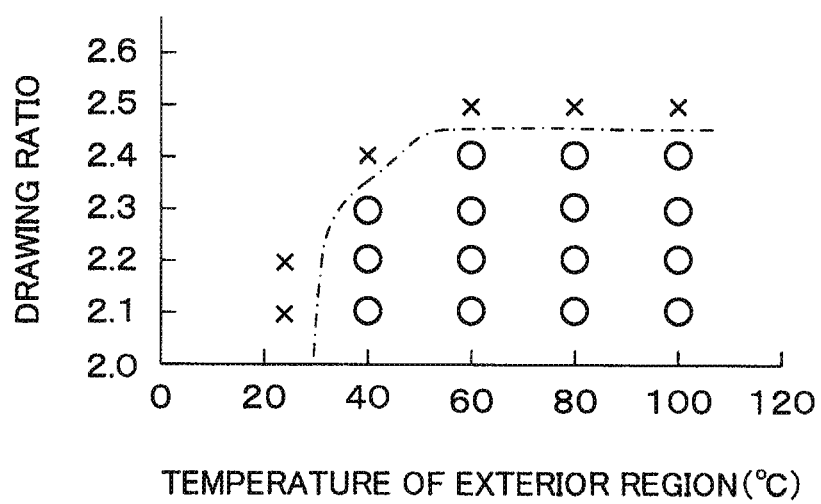
FIG. 7 is an illustrative view showing the drawing performance achieved when the method for manufacturing external cladding for a laminate battery according to this embodiment is applied to Ni-free austenitic stainless steel foil.

FIG. 7 is an illustrative view showing the drawing performance achieved when the method for manufacturing external cladding for a laminate battery according to the inventive embodiment is applied to Ni-free austenitic stainless steel foil. The present applicant investigated the drawing performance in a case where Ni-free austenitic stainless steel foil (16 Cr–2.5 Ni–3 Mn–3 Cu) having a sheet thickness of 100 μm was used as the stainless steel foil 32. As shown in FIG. 7, at room temperature, molding defects occurred even when drawing was performed at a drawing ratio of 2.1, but by setting the temperature of the exterior region 32b within the range of 40° C. to 100° C., molding could be achieved successfully even when drawing was performed at a larger drawing ratio. It is evident from these results that when the temperature conditions according to the inventive embodiment are applied, deep drawing can be realized without the use of lubricating oil even Ni-free austenitic stainless steel foil. Note that apart from the material of the stainless steel foil 32, processing conditions of the example shown in FIG. 7 were identical to the processing conditions of the example shown in FIG. 5.

Figure 8:
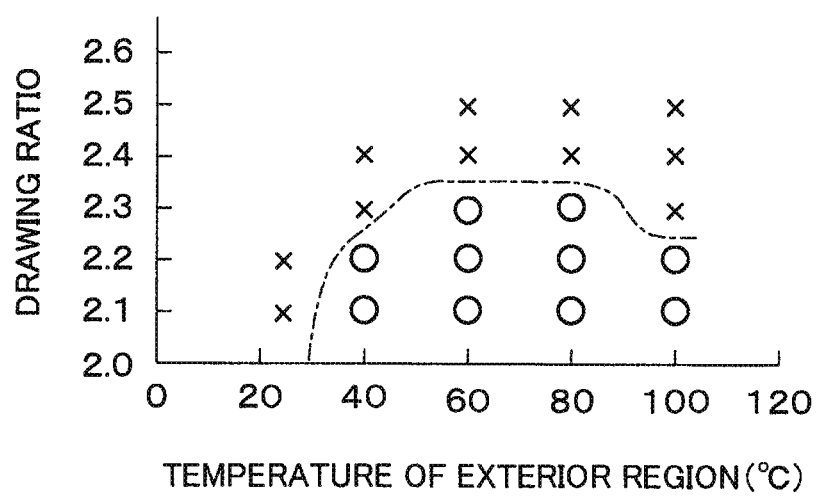
FIG. 8 is an illustrative view showing the drawing performance when lubricating oil is used on Ni-free austenitic stainless steel foil.

FIG. 8 is an illustrative view showing the drawing performance when lubricating oil is used on Ni-free austenitic stainless steel foil. Similarly to the comparative example of FIG. 6, drawing was implemented on Ni-free austenitic stainless steel foil having a sheet thickness of 100 μm, but not provided with the thermoplastic resin layer 30 and the lubricating film 31 while supplying lubricating oil, as in the prior art. As shown in FIG. 8, when lubricating oil was used, the upper limit drawing ratio at which molding could be achieved successfully was lower than when the method according to the inventive embodiment was applied. The assumed reason for this is that in the temperature range according to the inventive embodiment, the thermoplastic resin layer 30 and the lubricating film 31, having been softened by heating, exhibit a superior lubricating property to lubricating oil. It is evident from these results that the method of implementing warm working is also superior when Ni-free austenitic stainless steel foil is used as the material.

According to the inventive method for manufacturing external cladding for laminate battery, by employing the austenitic stainless steel foil 32 having the thermoplastic resin layer 30 on one of the front surface and the rear surface and the lubricating film 31 on the other surface as a material and performing drawing on the material under appropriate temperature conditions without the use of lubricating oil, an increase in battery capacity can be accommodated and the possibility of infiltration of contamination by impurities in the interior of the laminate battery can be reduced. Further, the external cladding 21 can be manufactured such that the projecting portion 21a thereof is provided at a sufficient depth, and therefore sufficient space can be secured in the housing space 22 even when the external cladding 21 is adhered to the flat plate-shaped first external cladding 20. Distortion occurs in the external cladding during drawing, and therefore, when an attempt is made to adhere external claddings respectively having projection portions to each other, the distortion may cause an adhesion defect. However, by providing one external cladding 20 in a flat plate shape, as in this embodiment, the possibility of adhesion defects can be reduced.

Note that in the inventive embodiment, temperature of the annular region 32a of the stainless steel foil 32 is set at no higher than 20° C. and no lower than 0° C. and the exterior region 32b of the stainless steel foil 32 is set at no lower than 40° C. and no higher than 100° C. by cooling the punch 42 and heating the blank holder 44 and die 48, but the method of setting the respective temperatures of the annular region and the exterior region at predetermined temperatures is not limited thereto, and a method such as heating the entire stainless steel foil serving as the material and then pressing a separate cooling body to the punch against the annular region, for example, may be employed instead.

The invention claimed is:

1. A method for manufacturing an external cladding for a laminate battery wherein;
   an external cladding for a laminate battery, in which a projecting portion for housing a battery element is formed is manufactured by
   using as a material austenitic stainless steel foil having a thermoplastic resin layer on one of a front surface and a rear surface and a lubricating film on the other of the front surface and the rear surface;
   disposing the stainless steel foil such that the surface provided with the thermoplastic resin layer is opposite a punch; and
   implementing drawing on the stainless steel foil without using lubricating oil in a condition where an annular region of the stainless steel foil, which is contacted by a shoulder portion of the punch, is set at a temperature between 0° C. and 20° C., and an exterior region on an exterior of annular annular region is set at a temperature between 40° C. and 100° C. while softening the lubricating film by the heat of the exterior region,
   wherein the lubricant film is a resin film formed from one or more types of resins selected from a polyvinyl alcohol resin, urethane resin, and acrylic resin, wherein the ratio between a weight of OH groups and a total weight of the resin is no less than 0.2.

* * * * *